US010201250B2

(12) United States Patent
Van Puijenbroek et al.

(10) Patent No.: US 10,201,250 B2
(45) Date of Patent: Feb. 12, 2019

(54) THERMOFORMED CONTAINER WITH LID

(71) Applicant: N.V. Nutricia, Zoetermeer (NL)

(72) Inventors: Alexander Josephus Maricus Van Puijenbroek, Utrecht (NL); Sjors Floris Crusius, Utrecht (NL); Priya Caroline Roberts, Utrecht (NL); Benoit Marie Francois Piette, Utrecht (NL); Patrick Michael Van Baal, Utrecht (NL); Franck Perek, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 529 days.

(21) Appl. No.: 14/769,609

(22) PCT Filed: Feb. 24, 2014

(86) PCT No.: PCT/NL2014/050111
§ 371 (c)(1),
(2) Date: Aug. 21, 2015

(87) PCT Pub. No.: WO2014/129902
PCT Pub. Date: Aug. 28, 2014

(65) Prior Publication Data
US 2016/0000269 A1    Jan. 7, 2016

(30) Foreign Application Priority Data

Feb. 22, 2013   (WO) ................ PCT/NL2013/050114

(51) Int. Cl.
*B65D 51/20*      (2006.01)
*A47J 47/04*      (2006.01)
(Continued)

(52) U.S. Cl.
CPC ............... *A47J 47/04* (2013.01); *A23L 33/40* (2016.08); *B65B 7/28* (2013.01); *B65D 43/02* (2013.01);
(Continued)

(58) Field of Classification Search
CPC ........... B65D 51/20; B65D 2251/0021; B65D 2251/0093; B65D 2251/0028; A47J 47/04
(Continued)

(56) References Cited

U.S. PATENT DOCUMENTS 4,736,870 A * 4/1988 Christensson ........... B65D 5/66
                                                    220/495.06
6,761,279 B1 * 7/2004 Martin ................ B65D 43/169
                                                    220/254.3
(Continued)

FOREIGN PATENT DOCUMENTS

CH       463 986 A      10/1968
DE       24 47 903 A1    4/1976
(Continued)

OTHER PUBLICATIONS

International Search Report, dated May 16, 2014, from corresponding PCT application.

*Primary Examiner* — Shawn M Braden
(74) *Attorney, Agent, or Firm* — N. V. Nederlandsch Octrooibureau; Catherine A. Shultz; Tamara C. Stegmann

(57) ABSTRACT

A container assembly includes a thermoformed tub of relatively thin plastic material having a peripheral wall extending to an upper edge and defining a product containing space. A lower rim is connected to the upper edge of the tub, the lower rim defining an opening giving access to the product containing space and being formed of a relatively thicker plastic material. An upper rim is connectable to the lower rim and a lid is provided for selectively closing the
(Continued)

opening. By the use of a thin walled thermoformed tub, the amount of material required for forming the body of the container is limited. Furthermore, the lower rim of relatively thicker plastic material provides the required support to the relatively thin material of the peripheral wall, allowing effective connection to the upper rim.

20 Claims, 7 Drawing Sheets

(51) Int. Cl.
    *B65D 51/24*    (2006.01)
    *G01F 19/00*    (2006.01)
    *B65B 7/28*    (2006.01)
    *B65D 43/02*    (2006.01)
    *B65D 43/16*    (2006.01)
    *B65D 51/18*    (2006.01)
    *B65D 59/04*    (2006.01)
    *A23L 33/00*    (2016.01)

(52) U.S. Cl.
    CPC .............. *B65D 43/16* (2013.01); *B65D 51/18* (2013.01); *B65D 51/246* (2013.01); *B65D 59/04* (2013.01); *G01F 19/002* (2013.01); *B65D 2251/009* (2013.01); *B65D 2251/0021* (2013.01); *B65D 2251/0028* (2013.01); *B65D 2251/0081* (2013.01); *B65D 2251/0093* (2013.01); *B65D 2543/00833* (2013.01)

(58) Field of Classification Search
    USPC .............................................. 220/254.3, 651
    See application file for complete search history.

(56) References Cited

U.S. PATENT DOCUMENTS

| | | | |
|---|---|---|---|
| 7,546,930 B2 * | 6/2009 | Banik | B65D 83/0805 |
| | | | 206/233 |
| 8,348,079 B2 * | 1/2013 | Baird-Smith | B65D 43/0231 |
| | | | 220/258.1 |
| 8,511,499 B2 * | 8/2013 | Perry | B65D 51/24 |
| | | | 220/254.3 |
| 2008/0041861 A1 | 2/2008 | Crawford et al. | |
| 2008/0156805 A1 | 7/2008 | Perry et al. | |

FOREIGN PATENT DOCUMENTS

| | | | |
|---|---|---|---|
| EP | 1 157 933 A2 | 11/2001 | |
| EP | 0 658 481 A1 | 11/2012 | |
| EP | 2 527 265 A1 | 11/2012 | |
| WO | 2010/071424 A1 | 6/2010 | |
| WO | WO 2012165952 A1 * | 12/2012 | ......... B65D 21/0204 |

* cited by examiner

THERMOFORMED CONTAINER WITH LID

BACKGROUND OF THE INVENTION

Field of the Invention

The present invention relates to containers for the packaging and dispensing of products, in particular powdered products such as infant nutrition or milk formula. The invention relates in particular to a thin walled thermoformed container with a re-closable lid.

Description of the Related Art

Powdered material, such as infant milk formula, has been sold in various forms of package for many years. Metal cans were initially the preferred container as they were relatively easy and cheap to produce and could be sealed for long term storage. The seal comprised an aluminium foil across the mouth of the container that was removed on first use. As a single container would be used for an extended period, the containers were provided with re-closable plastic lids which gripped over the outer rim of the can. A measuring scoop was frequently included with the container, either packaged separately or within the can itself. Such cans are however relatively heavy and expensive to produce.

More recently, alternative packaging forms have become available which improve on the existing cans. These include plastic and foil laminate container bodies and hinged lid assemblies having a facility to receive and retain a measuring scoop. One such package is described in US 2008041861, having a seal for initially closing the package and a space between the seal and an upper edge of the container for partially receiving the scoop prior to use. The container part may consist of a laminate of carton, metal foil and plastic material. A further similar package is shown in WO2010071424.

Laminate wall constructions allow the container to be produced relatively cheaply, while ensuring strength and good conservation of the contents. Nevertheless, the use of such materials may be disadvantageous for recycling of the containers. It would therefore be desirable to provide an alternative container construction that alleviated at least some of the perceived inconveniences of the prior art.

BRIEF SUMMARY OF THE INVENTION

According to the invention, there is provided a container assembly comprising: a thermoformed tub of relatively thin plastic material having a peripheral wall extending to an upper edge and defining a product containing space; a lower rim connected to the upper edge of the tub, the lower rim defining an opening giving access to the product containing space and being formed of a relatively thicker plastic material; an upper rim connectable to the lower rim; and a lid for selectively closing the opening. By the use of a thin walled thermoformed tub, the material required for forming the body of the container is limited. Furthermore, the lower rim of relatively thicker plastic material provides the required support to the relatively thin material of the peripheral wall, allowing effective connection to the upper rim. In this context, relatively thin is understood by the skilled person to be with respect to the rim material. The tub may be manufactured to have a wall thickness that is adequate to provide the barrier properties and strength required. The thickness of the wall may be about 0.10 mm to 0.50 mm, preferably between 0.15 and 0.40 mm. The lower rim may be significantly thicker, measured at its smallest dimension and may have a thickness sufficient to ensure a secure mechanical connection with the upper rim.

According to one embodiment of the invention, the assembly further comprises a membrane seal for sealing the product containing space prior to use. The membrane seal may comprise a metal foil or may be a plastics-only foil. A preferred material comprises polypropylene outer layers with a barrier layer of e.g. EVOH laminated therebetween. It may be removed in its entirety prior to use or may comprise a weakened tear line defining an opening region, and a pull tab. The membrane may be provided at various locations but most preferably, the membrane is sealed across the upper edge of the tub. In particular, it will be understood that thermoformed tubs generally have an outwardly extending flange forming the upper edge and the membrane may be sealed across the flange. In an alternative embodiment, the membrane may be sealed to the lower rim to close the opening. In that case, the skilled person will understand that the connection between the lower rim and the upper edge of the tub must be a sealed connection.

Various methods for connecting the lower rim to the upper edge of the tub may be provided, including mechanical connections that may be releasable or permanent or by adhesive. Preferably the lower rim and upper edge are permanently connected by welding, in particular ultrasonic welding. It will be understood that although reference is given to the lower rim being attached to the upper edge, this is not intended to exclude that a membrane seal may be interposed.

The lower rim may have a relatively simple form, such as a flat annulus providing merely a relatively rigid connection for the upper rim. Preferably however the lower rim has a complex functional form with a lower face for engaging the upper edge of the tub and an inner face for defining the opening to the product containing space. In one embodiment the lid, in the closed position, seals only with the upper rim. In another embodiment, an upper surface of the lower rim may be provided with grooves, ridges and the like for interengagement with the upper rim and or the lid. In this context, inner face is intended to denote that this surface extends more than just the material thickness of the rim and may extend from 2 mm to 10 mm in the vertical direction. The inner face may form a sealing surface for receipt of the lid. Furthermore, the inner face may define the access opening to be somewhat smaller than the mouth of the tub as defined by its upper edge. In particular, the inner face may be located at a position at least 5 mm inwardly of the inner wall. The lower rim may also be provided with a scoop holder and levelling portions. These may extend inwards into the access opening. It will be understood that some or all of these features may alternatively be provided on the upper rim.

The upper rim and the lower rim may also be connected together in any appropriate manner, either permanently or non-permanently. Most preferably they are mechanically connected together e.g. by snap-fit connectors. The upper rim may then be joined to the lower rim at a later stage in the manufacturing procedure, e.g. after filling of the product containing space. It is also conceivable that the upper rim and the lid may be reusable a number of times and may be applied to a filled tub after purchase.

According to an important aspect of the invention, the fact that the lower rim and the upper rim are initially separate items means that each can be separately manufactured in the most appropriate manner, preferably by injection moulding. In a preferred embodiment, the upper rim and the lid are hinged to one another. Most preferably they are integrally formed together with a living hinge e.g. by injection moulding. Preferred materials for the lid and rim are polypropylene (PP), polyethylene (PE) and polyethylene terephthalate (PET) or combinations thereof, although the skilled person will be familiar with various alternatives which could provide similar engineering properties. The lid and the upper or lower rim may be provided with appropriate catches and closure elements. They may also be provided with a tamper evident closure indication.

According to a further preferred embodiment, the assembly may further comprise a carton sleeve enveloping and supporting the thermoformed tub. The carton sleeve may fit closely to the tub with an interference fit and may provide the necessary strength to the peripheral wall in order to be form stable. In other words, the thin plastic material of the peripheral wall may have insufficient strength alone to adequately maintain the shape of the tub e.g. when stacking containers on each other. By combining this with a carton sleeve, improved strength may be achieved. The respective layers may be separated for recycling. The sleeve may comprise carton of 50 to 400 g/m$^2$, preferably 100 to 300 g/m$^2$. The sleeve may be open at the bottom or may extend under the base of the tub.

The tub may be manufactured of any appropriate material capable of being thermoformed. A most suitable material is polypropylene. However, other polymer materials such as polyethylene terephthalate (PET) or polyethylene (PE) can be used as well. Multi layer materials may also be used, subject to the requirements of recycling.

The invention also relates to a package comprising the assembly as described above, filled with a powdered material. The package is especially suited to contain a powdered nutritional product, in particular infant milk formula.

According to one embodiment, the package may have a generally square or rectangular outer profile with rounded corners. The volume of the package may be between 1 liter and 3 liters, preferably around 1.5 liters and the access opening preferably has a minimum dimension of at least 70 mm more preferably around 100 mm and an area of at least 100 cm$^2$. The overall length of the package may be between 150 mm and 250 mm, preferably about 185 mm. The width of the package may be between 100 mm and 150 mm, preferably around 120 mm. The package may be available in multiple heights according to volume required, varying from 80 mm to 150 mm.

Preferably, a scoop is provided within the package and may be located above the membrane seal prior to use. It is also conceivable that a scoop is integrally formed with the lid construction and separated at first use. The scoop is preferably of low profile design, having a bowl with a width that is relatively smaller than both its length and its depth. The bowl may have a mouth of generally rectangular shape and the scoop may have a handle portion with the bowl being no wider than the handle portion in order to maximise the effective use of the head space within the package. Preferably the scoops are stackable and may have tapered or stepped bowls that nest together. An elongate opening may be provided through the handle portion adjacent to the bowl in order to prevent powder collecting on the handle portion during measuring, which can effect accuracy.

According to a still further aspect of the invention there is also disclosed a method of manufacturing a package of powdered material, comprising: thermoforming a tub of relatively thin plastic material having a peripheral wall extending to an upper edge and defining a product containing space; filling the product containing space with the powdered material; applying a membrane seal to seal the powdered material within the product containing space; and connecting a lower rim to the upper edge, the lower rim defining an access opening. The package may be as described above.

The method may further comprise connecting an upper rim to the lower rim, the upper rim being provided with a sealing lid for sealing the access opening. The upper rim may be connected to the lower rim during a separate manufacturing step or may be connected by a consumer, e.g. after removing the membrane seal.

BRIEF DESCRIPTION OF THE DRAWINGS

The features and advantages of the invention will be further appreciated upon reference to the following drawings of a number of exemplary embodiments, in which.

DESCRIPTION OF ILLUSTRATIVE EMBODIMENTS

Figure 1:
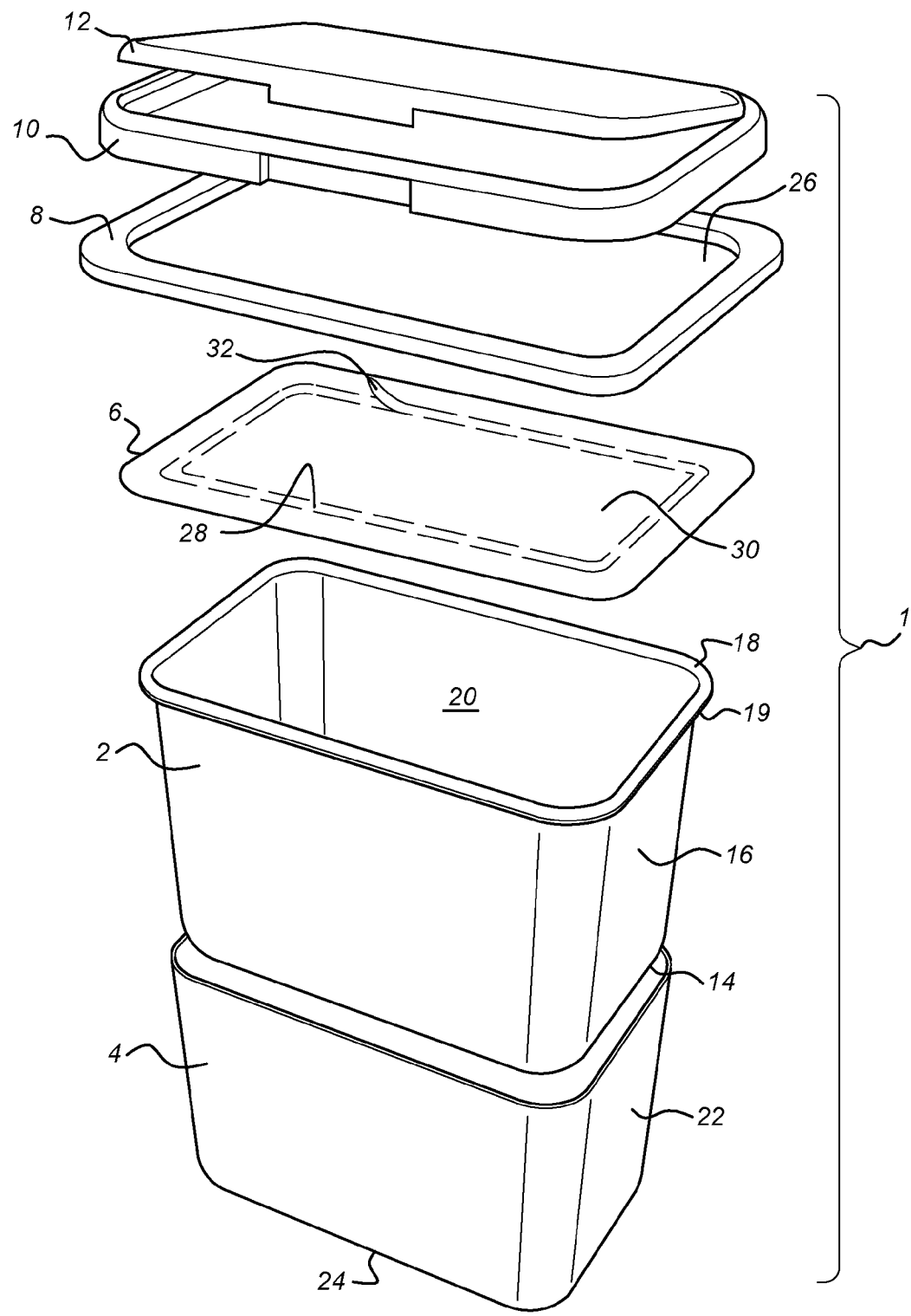
FIG. 1 shows a package according to a first embodiment of the present invention in partly exploded perspective view.

FIG. 1 shows a partially exploded view of a container assembly 1 according to a first embodiment of the invention comprising a tub 2, a sleeve 4, a membrane seal 6, a lower rim 8, an upper rim 10 and a lid 12.

The tub 2 is thermoformed of relatively thin polypropylene material and has a base 14 and a peripheral wall 16 defining a product containing space 20. The peripheral wall 16 extends to an upper edge 18 having an outwardly directed flange 19. The sleeve 4 is formed of carton and has wall 22 and a bottom 24. Lower rim 8 is formed as a flat annular ring of a similar dimension to the outwardly directed flange 19 and defines an opening 26 to the product containing space 20. The lower rim is also made of polypropylene too although it will be understood that other appropriate materials could also be employed. The seal 6 includes a tear line 28 defining an opening region 30 and includes a pull tab 32.

Figure 2:
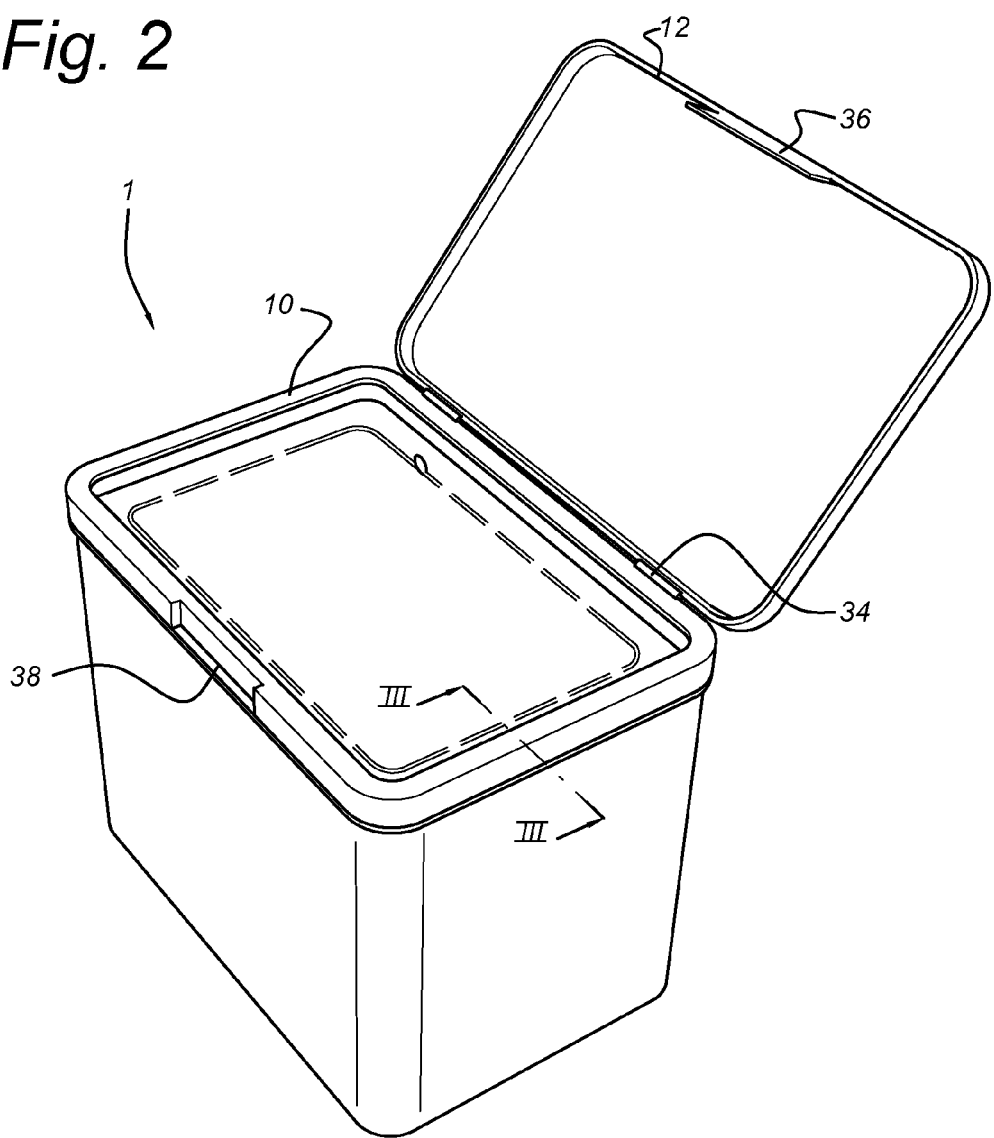
FIG. 2 shows a perspective view of the embodiment of FIG. 1.

FIG. 2 shows a perspective view of the container assembly 1 of FIG. 1 in the assembled state with the lid 12 opened. The lid 12 and the upper rim 10 are integrally formed in a single piece by injection moulding with a living hinge 34 between them. Also visible is a catch 36 on the front edge of the lid 12, which engages with a recess 38 on the upper rim 10 to maintain the lid 12 closed.

Figure 3:
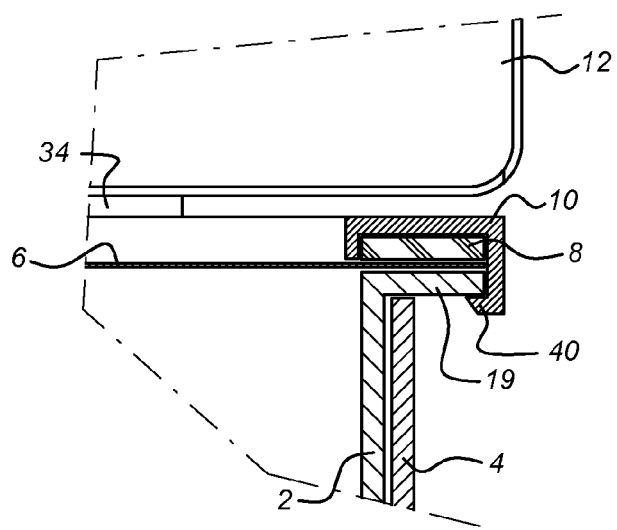
FIG. 3 shows a partial cross-section on line through FIG. 2.

FIG. 3 is a cross-section through part of the container assembly 1 along line III-III of FIG. 2. As can be seen, the seal 6 is attached across the flange 19 of the tub 2 and sandwiched by the lower rim 8 which overlies the flange 19. The flange 19, seal 6 and lower rim 8 are all welded together to form a single relatively rigid rim structure. Upper rim 10 is mechanically engaged with the lower rim 8 by a downwardly extending snap connection 40. As can also be seen in this view, sleeve 4 closely engages against the peripheral wall 16 of tub 2, extending up to beneath the flange 19 to provide additional support. This allows the upper rim 10 to be snapped onto the lower rim 8 without causing deformation or collapse of the tub 2.

Figure 4:
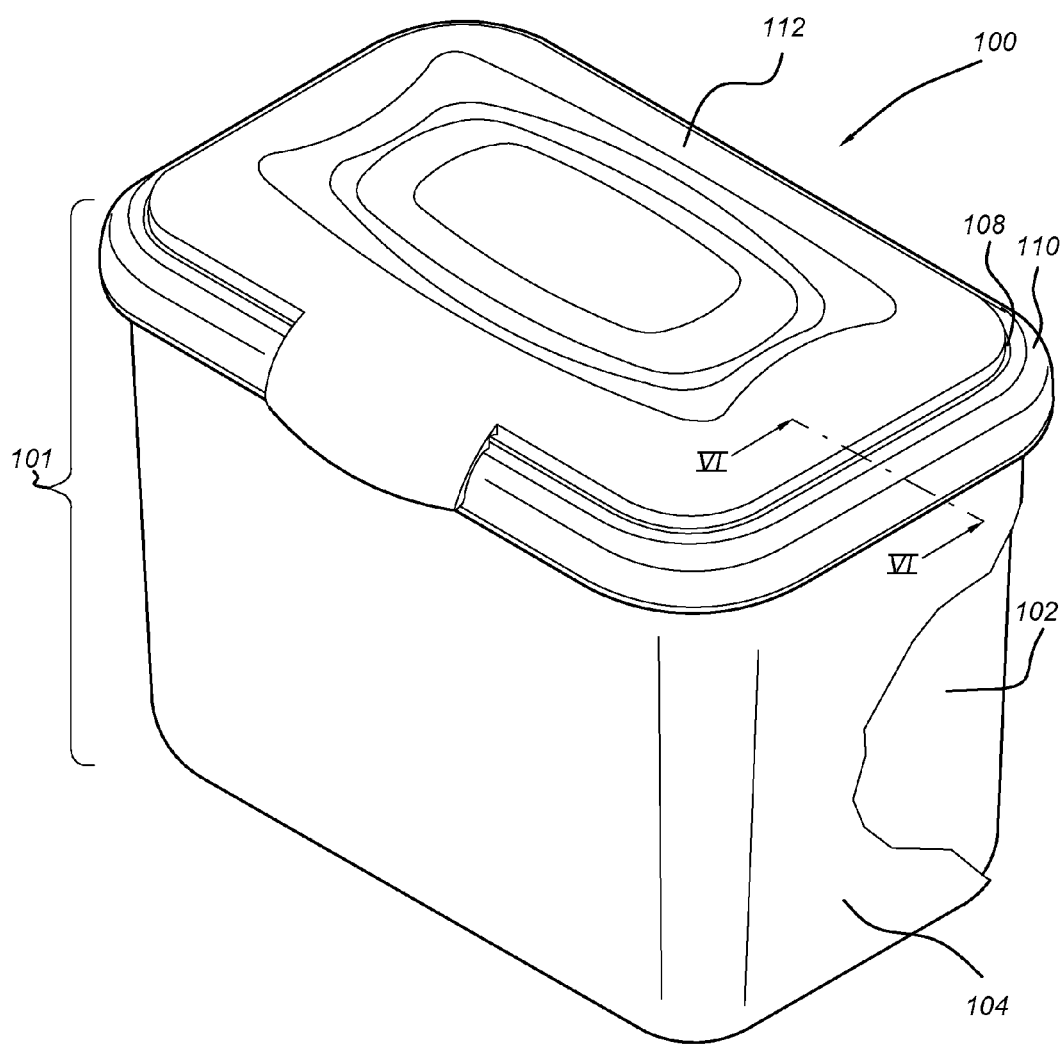
FIG. 4 shows a package according to a second embodiment of the invention in perspective view.

A package 100 according to a second embodiment of the invention is shown in perspective view in FIG. 4 in closed condition. Like elements to the first embodiment are provided with similar reference numerals preceded by 100. Visible in FIG. 4 is container assembly 101 comprising tub 102 with sleeve 104, upper rim 110 and lid 112. A portion of lower rim 108 is also visible between upper rim 110 and lid 112.

Figure 5:
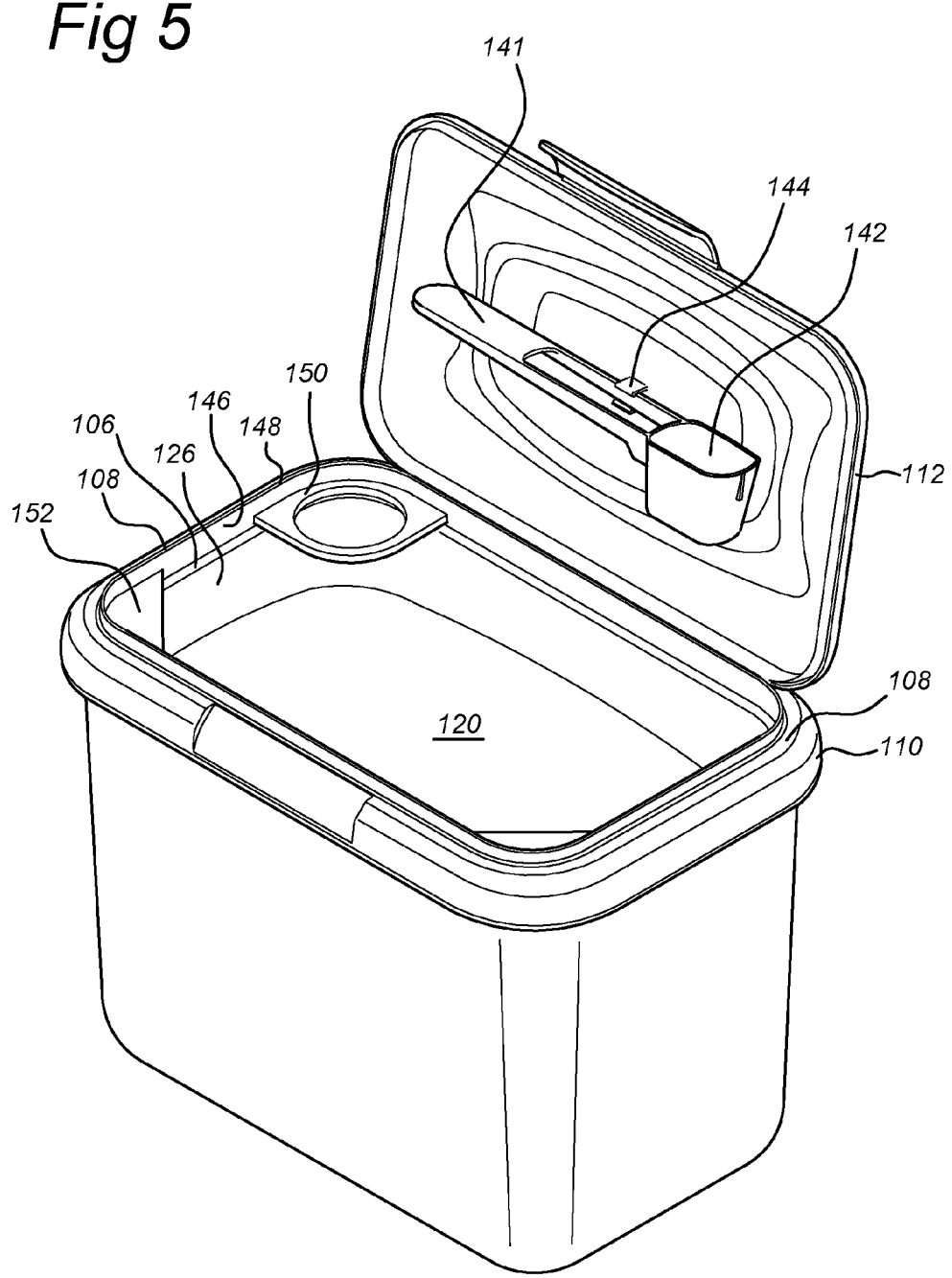
FIG. 5 shows the package of FIG. 4 with the lid opened.

FIG. 5 shows the package 100 of FIG. 4 with the lid 112 opened. The package 100 has been opened by tearing membrane seal 106 to reveal the contents P within the product containing space 120. Within the lid 112 is located a scoop 142 having a handle portion 141, gripped by a clip 144. The scoop 142 is conveniently shaped to be relatively narrow, allowing it to be placed on its side within the limited head space within the lid 112. The handle portion 141 has an open structure, which is convenient for preventing a build-up of powder on the handle portion 141 when in use. In the open position of the lid 112, the opening 126 through the lower rim 108 can be seen. The lower rim 108 has an inner face 146 which defines the opening 126 and which extends a distance upwards from the seal 106 to a sealing lip 148. The lower rim also incorporates a scoop holder 150 and left and right-handed levellers 152. After use of the scoop 142 it may be placed in the scoop holder 150.

Figure 6:
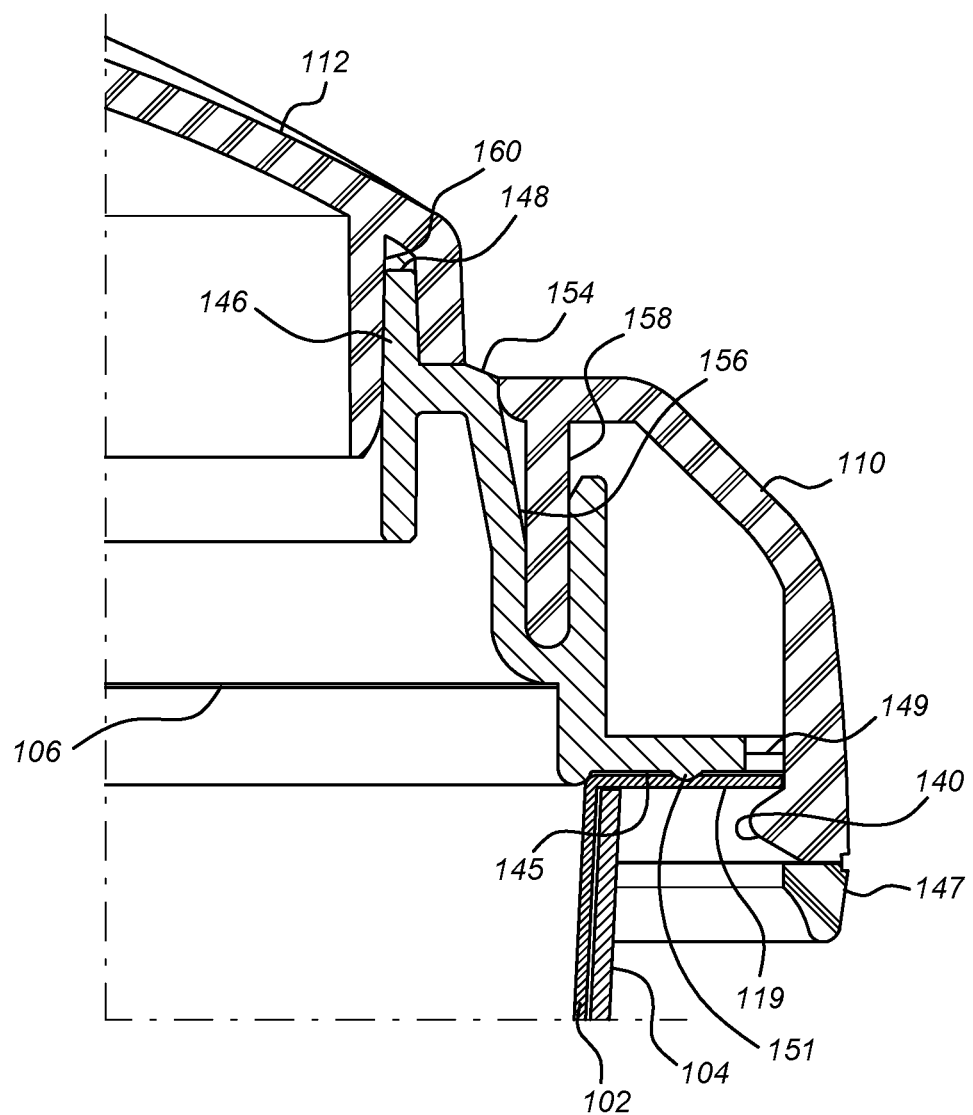
FIG. 6 shows a partial cross-section on line VI-VI through FIG. 4.

FIG. 6 shows a cross-section of part of the package of FIG. 4, taken along line VI-VI. It will be appreciated in this view that the lower rim 108 has a relatively complex profile compared to that of the first embodiment. Seen in cross-section, the lower rim 108 has a lower face 145, which engages with flange 119 of tub 102, sandwiching the seal 106 therebetween as in the first embodiment. On the lower face 145 is provided an ultrasonic director 151 in the form of a triangular shaped ridge. This serves to concentrate the energy during an ultrasonic welding procedure, ensuring a uniform weld around the full circumference of the flange 119. An upper surface 154 of the lower rim 108 has a U-shaped groove 156. The lower rim 108 also has an outer skirt 147 provided with slots 149. The upper rim 110 and lid 112 also have complex profiles for engagement with the lower rim 108. In particular, the upper rim 110 has snap connection 140 for engagement with slots 149 and a web 158 which is sized and positioned to engage in U-shaped groove 156. Lid 112 has a downwardly extending sealing groove 160 sized to engage with sealing lip 148.

Figure 7:
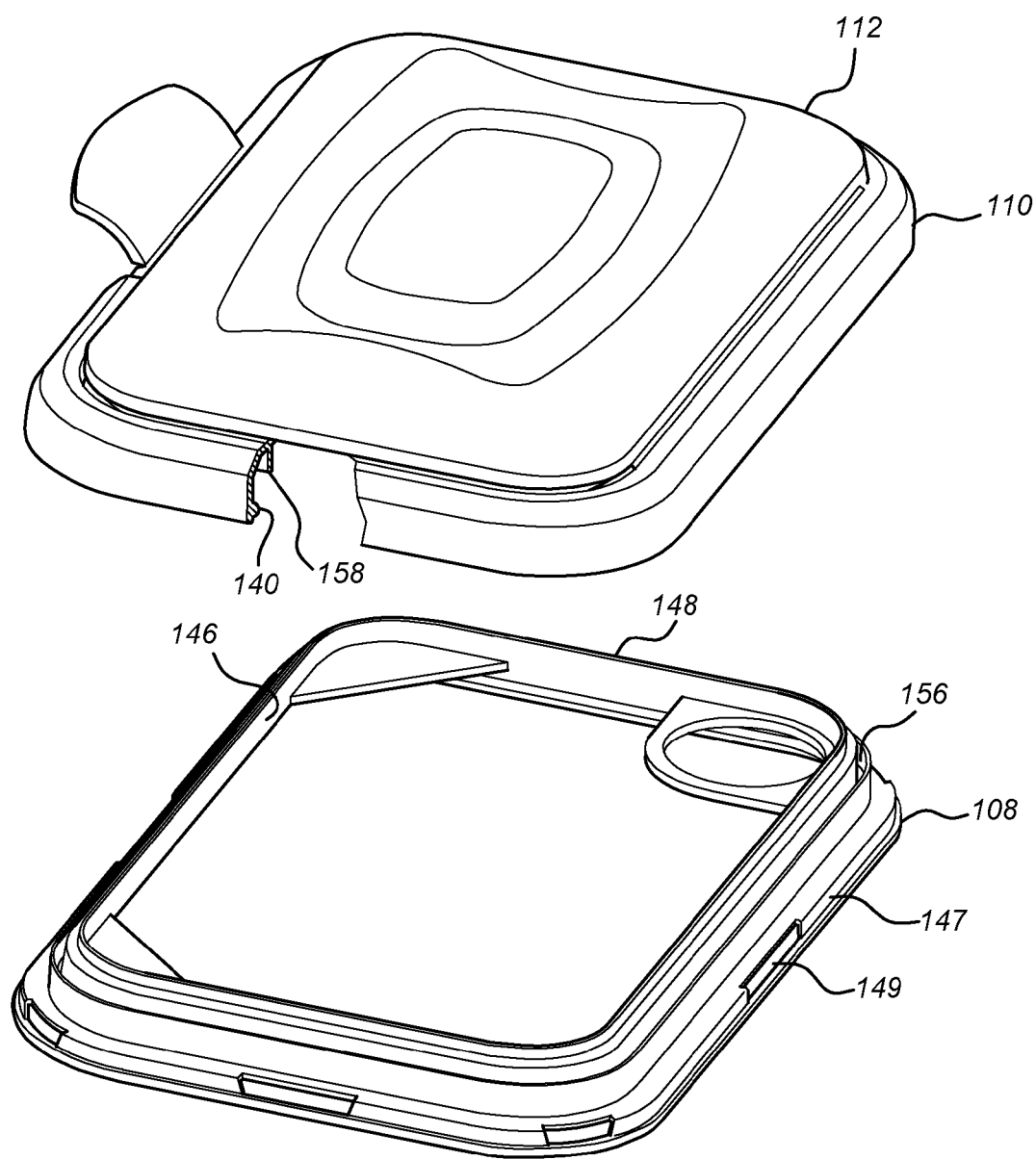
FIG. 7 shows the lid and upper rim and the lower rim of the second embodiment in perspective view.

FIG. 7 shows the lower rim 108 and the upper rim 110 and lid 112 in perspective view. The slots 149 through the outer skirt 147 are visible, as are the sealing lip 148, inner face 146 and U-shaped groove 156. Upper rim 110 is cut away to reveal snap connections 140 and web 158.

Figure 8:
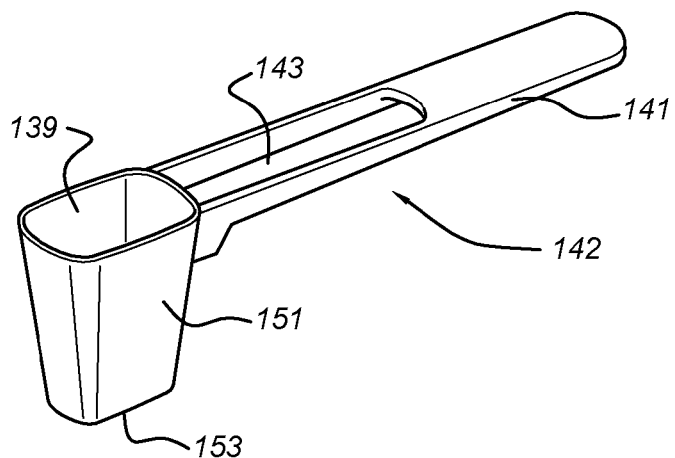
FIGS. 8 to 10 show alternative scoops for use in the invention.

FIG. 8 shows in greater detail the scoop 142 of FIG. 5 showing an elongate opening 143 through the handle portion 141. The bowl 151 of the scoop 142 has a mouth 139 with a width corresponding to the width of the handle portion 141. It tapers towards a slightly narrower closed underside 153 with a taper angle of around 6° in both width and length directions. This allows convenient stacking together of scoops during manufacture and transport. The illustrated scoop 142 has a mouth 139 of 28 mm in length and 19 mm in width. The depth dimension of around 35 mm ensures a scoop volume of 11.5 ml. By varying just the depth dimension, different scoop volumes may be provided while maintaining the same overall design. In particular, a scoop volume of 8 ml may be provided having a scoop depth of 22 mm and a scoop volume of 9.5 ml may have a depth dimension of 27 mm.

Figure 9:
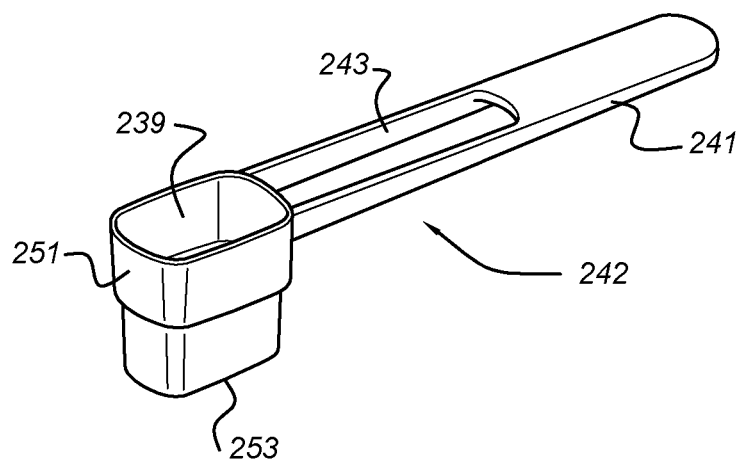

FIG. 9 shows an alternative scoop 242 having a handle portion 241 similar to that of FIG. 8 with an elongate opening 243. The scoop 242 differs from the earlier design of FIG. 8 in that the bowl 251 has a stepped structure. The mouth 239 has the same width as the handle portion 241 but the bowl 251 no longer tapers downwards. Instead, it has a constant cross-section to a step 250 at a mid-point of the bowl and then a smaller constant cross-section extending to the closed underside 253. Scoops 242 of this design may stack or nest together with the bowl 251 of one scoop extending into the next scoop up to the step 250. As above, different volumes may be provided by varying the depth of the bowl 251 with the step 250 preferably always being located at the mid-point.

Figure 10:
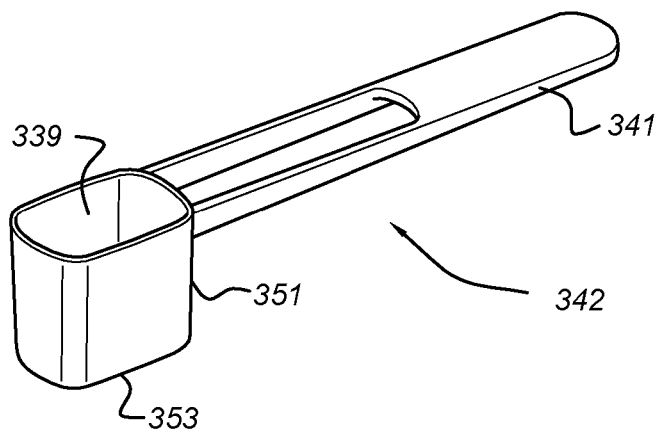

FIG. 10 shows a still further design of scoop 342 having a relatively simple structure of bowl 351. In this design, the handle portion 341 is identical to earlier designs but the bowl 351 has a constant cross-section from mouth 339 to underside 353 and is not stackable. The skilled person will understand that many other alternative configurations of scoop may be provided and that the design of the scoop may be independent of the design of the container assembly itself.

Thus, the invention has been described by reference to certain embodiments discussed above. It will be recognized that many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A container assembly for powdered nutritional product, comprising:
    a thermoformed tub of relatively thin plastic material having a peripheral wall extending to an upper edge forming an outwardly extending flange and defining a product containing space;
    a membrane seal for sealing the product containing space prior to use, wherein the membrane is sealed across the outwardly extending flange;
    a lower rim connected to the upper edge of the tub, the lower rim defining an opening giving access to the product containing space and being formed of a thicker plastic material than the plastic material of the tub;
    an upper rim connectable to the lower rim; and
    a lid for selectively closing the opening.

2. The assembly according to claim 1, wherein the membrane comprises a weakened tear line defining an opening region, and a pull tab.

3. The assembly according to claim 1, wherein the upper rim and the lower rim are mechanically connected together by snap-fit connectors.

4. The assembly according to claim 1, wherein the lower rim is permanently connected to the upper edge of the tub, with the membrane seal interposed therebetween.

5. The assembly according to claim 4, wherein the lower rim is permanently connected to the upper edge of the tub by welding.

6. The assembly according to claim 1, wherein the lower rim has a lower face for engaging the upper edge of the tub and an inner face defining the opening.

7. The assembly according to claim 1, wherein the upper rim and the lid are hinged to one another.

8. The assembly according to claim 7, wherein the upper rim and the lid are hinged to one another by an integrally formed living hinge.

9. The assembly according to claim 1, further comprising a carton sleeve enveloping and supporting the thermoformed tub.

10. The assembly according to claim 1, wherein the tub comprises polypropylene.

11. The assembly according to claim 1, wherein the peripheral wall has a thickness between 0.10 mm and 0.50 mm.

12. The assembly according to claim 11, wherein the peripheral wall has a thickness between 0.15 and 0.40 mm.

13. Package comprising an assembly according to claim 1, further comprising a quantity of powdered nutritional product sealed within the product containing space.

14. The package according to claim 13, wherein the powdered nutritional product comprises infant milk formula.

15. Method of manufacturing a package of powdered material, comprising:
- thermoforming a tub of relatively thin plastic material having a peripheral wall extending to an upper edge with an outwardly extending flange and defining a product containing space;
- filling the product containing space with the powdered material;
- applying a membrane seal across the outwardly extending flange to seal the powdered material within the product containing space;
- connecting a lower rim to the upper edge, the lower rim defining an access opening; the lower rim being thicker than the tub, and
- connecting an upper rim to the lower rim, the upper rim being provided with a sealing lid for sealing the access opening.

16. The method according to claim 15, further comprising providing a carton sleeve enveloping and supporting the thermoformed tub.

17. The assembly according to claim 1, wherein the lower rim is of rigid plastic material.

18. The assembly according to claim 17, wherein the lower rim is of a material selected from the group comprising: polyethylene, polypropylene, polyethylene terephthalate or combinations thereof.

19. The assembly according to claim 17, wherein the lower rim is connected to the flange to provide support to the relatively thin material of the peripheral wall.

20. A container assembly for powdered nutritional product, comprising:
- a container of plastic material having a peripheral wall extending to an upper edge that is flared outwardly in the form of a horizontal flange, the container defining a product containing space;
- a membrane seal for sealing the product containing space prior to use, wherein the membrane is joined to the container across the horizontal flange;
- a lower rim connected to the upper edge of the container or to the membrane seal, the lower rim defining an opening giving access to the product containing space and being formed of a rigid plastic material that is thicker than the plastic material of the container and provides support to the upper edge of the container;
- an upper rim connectable to the lower rim in a snap fit connection; and
- a lid for selectively closing the opening, the lid being hingedly connected to the upper rim.

* * * * *